US005267697A

United States Patent [19]

Holecz

[11] Patent Number: 5,267,697

[45] Date of Patent: Dec. 7, 1993

[54] GARDEN SHREDDER APPARATUS

[76] Inventor: Frank Holecz, 7 Stoney Brook Dr., Old Bridge, N.J. 08857

[21] Appl. No.: 982,906

[22] Filed: Nov. 30, 1992

[51] Int. Cl.[5] .............. A01D 55/00

[52] U.S. Cl. .............. 241/92; 241/101.7; 241/282.2; 241/285.2

[58] Field of Search .............. 241/73, 92, 285.1, 285.2, 241/282.1, 282.2, 101.7

[56] References Cited

U.S. PATENT DOCUMENTS

| | | | |
|---|---|---|---|
| 3,153,435 | 10/1964 | Ober | 241/282.1 X |
| 3,527,278 | 9/1970 | Johnson, Jr. | 241/101.1 |
| 4,129,260 | 12/1978 | Baker | 241/73 X |
| 4,477,029 | 10/1984 | Green | 241/282.2 |
| 4,580,735 | 4/1986 | Lange | 241/101.7 |
| 4,640,465 | 2/1987 | Schmid | 241/92 X |
| 4,796,416 | 1/1989 | Bendig et al. | 241/101.1 X |
| 5,186,401 | 2/1993 | Herdman et al. | 241/285.2 X |

FOREIGN PATENT DOCUMENTS

| | | | |
|---|---|---|---|
| 251060 | 1/1988 | European Pat. Off. | 241/92 |
| 3729384 | 3/1989 | Fed. Rep. of Germany | 241/101.7 |
| 1125891 | 11/1956 | France | 241/282.2 |
| 381509 | 10/1964 | Switzerland | 241/282.1 |
| 643156 | 5/1984 | Switzerland | 241/92 |
| 2098504 | 11/1982 | United Kingdom | 241/282.2 |

*Primary Examiner*—Mark Rosenbaum
*Assistant Examiner*—Frances Chin
*Attorney, Agent, or Firm*—Leon Gilden

[57] ABSTRACT

A cylindrical housing having a lid is releasably mounted relative to the lid, with the housing having its axis in a parallel orientation and the lid having a support plate mounting plural pairs of legs that each are of a break-down construction and employ anchor plugs at their lowermost distal ends for securing the organization minimizing vibration in use. A hopper directs vegetation into the shredder, wherein a mesh screen arrangement mounted to the lid below the support plate permits ejection of finely shredded particles.

1 Claim, 4 Drawing Sheets

GARDEN SHREDDER APPARATUS

BACKGROUND OF THE INVENTION

1. Field of the Invention

The field of invention relates to garden shredder structure, and more particularly pertains to a new and improved garden shredder apparatus wherein the same is arranged to employ a minimal of structural components to effect a stable and conveniently employed structure of increased longevity in use.

2. Description of the Prior Art

Garden shredder structures of various types are utilized throughout the prior art and typically, such shredder organizations are employed with lawn mower organizations, as indicated in the U.S. Pat. Nos. 4,796,416 and 3,473,306. U.S. Pat. No. 3,527,278 sets forth a shredder structure arranged for operative communication relative to a lawn mower in a spaced relationship relative to the lawn mower structure.

The instant invention attempts to overcome deficiencies of the prior art by providing a compact readily anchored and easily employed organization of compact construction effecting longevity in use and in this respect, the present invention substantially fulfills this need.

SUMMARY OF THE INVENTION

In view of the foregoing disadvantages inherent in the known types of garden shredder apparatus now present in the prior art, the present invention provides a garden shredder apparatus wherein the same is arranged to employ a housing removably mounted to a lid and support structure. As such, the general purpose of the present invention, which will be described subsequently in greater detail, is to provide a new and improved garden shredder apparatus which has all the advantages of the prior art garden shredder apparatus and none of the disadvantages.

To attain this, the present invention provides a cylindrical housing having a lid releasably mounted relative to the lid, with the housing having its axis in a parallel orientation and the lid having a support plate mounting plural pairs of legs that each are of a breakdown construction and employ anchor plugs at their lowermost distal ends for securing the organization minimizing vibration in use. A hopper directs vegetation into the shredder, wherein a mesh screen arrangement mounted to the lid below the support plate permits ejection of finely shredded particles.

It is therefore an object of the present invention to provide a new and improved garden shredder apparatus which has all the advantages of the prior art garden shredder apparatus and none of the disadvantages.

It is another object of the present invention to provide a new and improved garden shredder apparatus which may be easily and efficiently manufactured and marketed.

It is a further object of the present invention to provide a new and improved garden shredder apparatus which may be easily and efficiently manufactured and marketed.

It is a further object of the present invention to provide a new and improved garden shredder apparatus which is of a durable and reliable construction.

An even further object of the present invention is to provide a new and improved garden shredder apparatus which is susceptible of a low cost of manufacture with regard to both materials and labor, and which accordingly is then susceptible of low prices of sale to the consuming public, thereby making such garden shredder apparatus economically available to the buying public.

Still yet another object of the present invention is to provide a new and improved garden shredder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
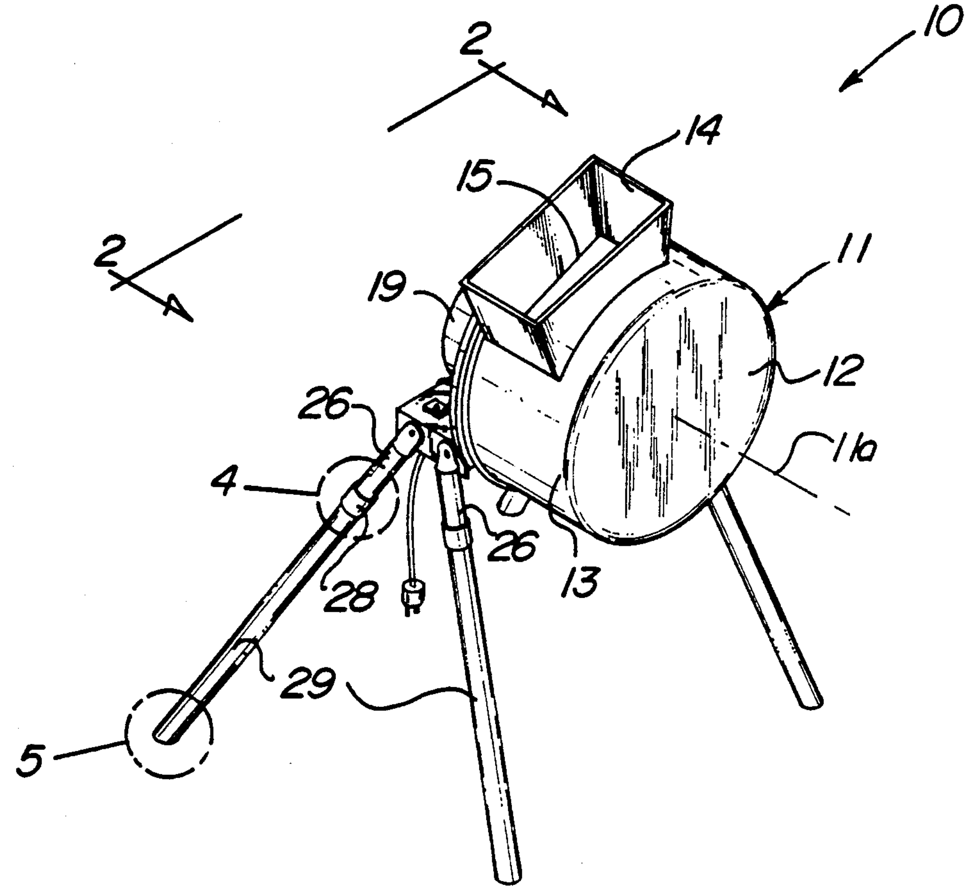
FIG. 1 is an isometric illustration of the invention.
Figure 2:
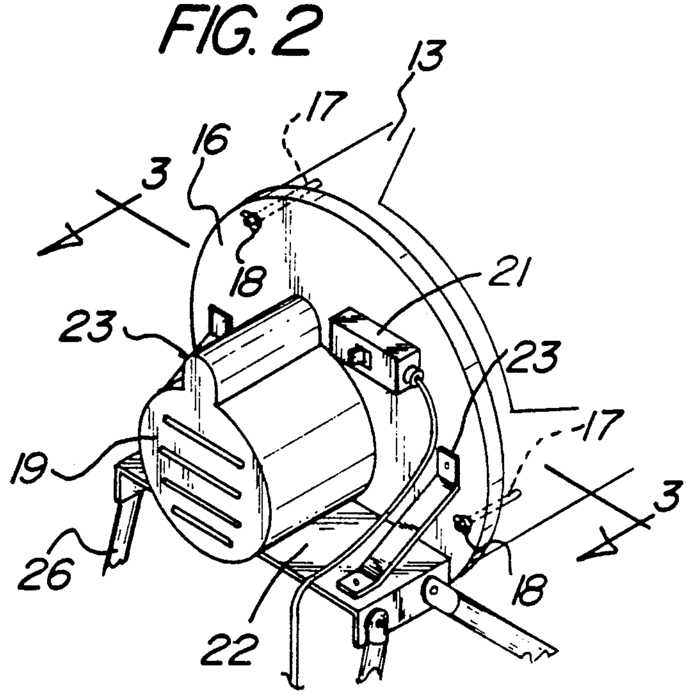
FIG. 2 is an isometric illustration, taken along the lines 2—2 of FIG. 1 in the direction indicated by the arrows.

With reference now to the drawings, and in particular to FIGS. 1 to 9 thereof, a new and improved garden shredder apparatus embodying the principles and concepts of the present invention and generally designated by the reference numeral 10 will be described.

More specifically, the garden shredder apparatus 10 of the instant invention essentially comprises a cylindrical housing 11 oriented about a housing axis 11*a*. The cylindrical housing 11 includes a planar end wall 12 and a cylindrical side wall 13 oriented about the aforenoted axis 11*a*. A hopper 14 is directed through the side wall in communication through a side wall opening 15 to direct garden components into the housing 11. A housing lid 16 is selectively securable to the side wall 13, with side wall fastener rods 17 fixedly mounted interiorly of the side wall 13 (see FIG. 3) parallel relative to the axis 11*a*, with the fastener rod 17 projecting through the lid 16 and having securement members 18 mounted to the lid exteriorly thereof to secure the lid to the housing structure.

Figure 3:
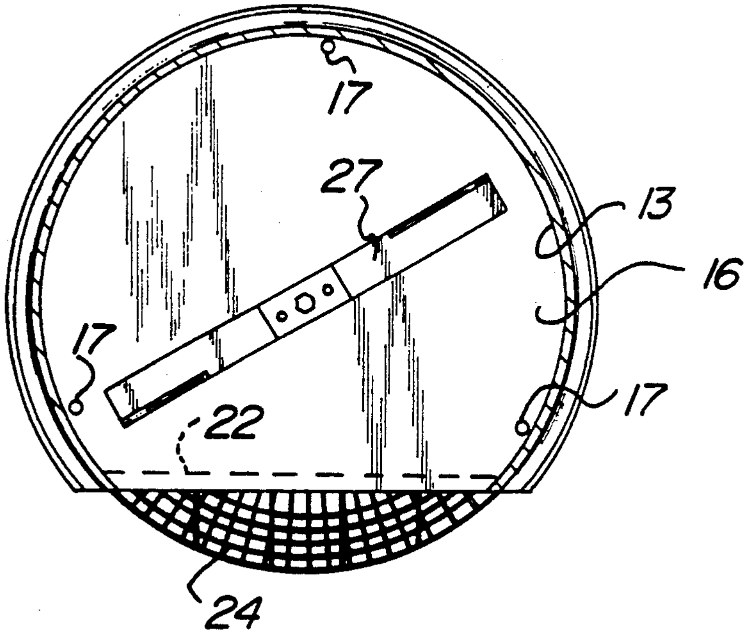
FIG. 3 is an orthographic view, taken along the lines 3—3 of FIG. 2 in the direction indicated by the arrows.
Figure 4:
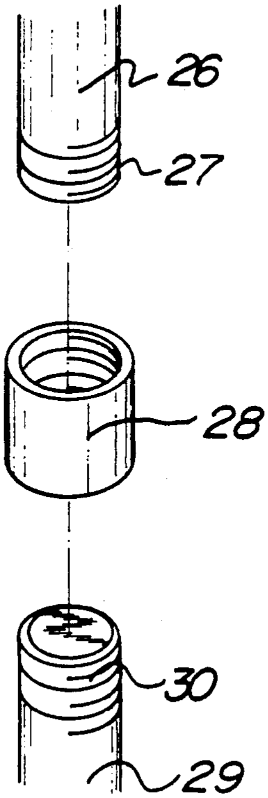
FIG. 4 is an isometric exploded view of section 4, as set forth in FIG. 1.
Figure 8:
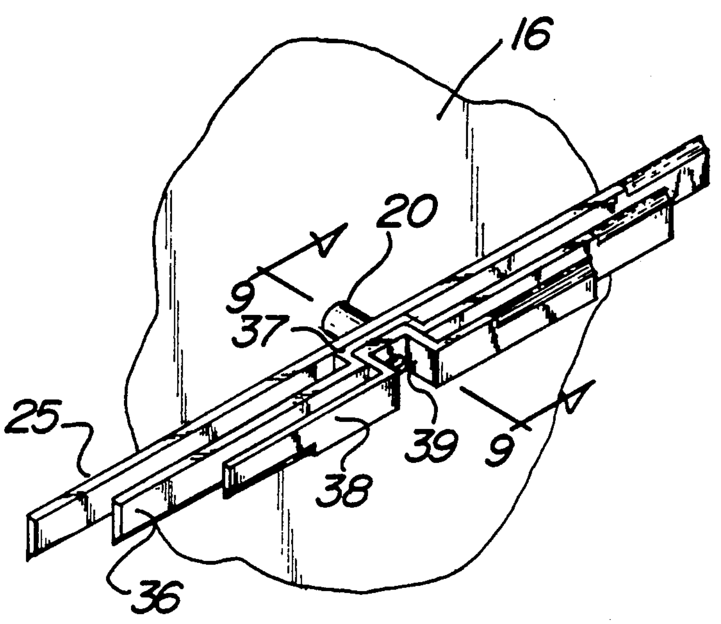
FIG. 8 is an isometric illustration of a modified blade structure.

A drive motor 19 is fixedly mounted to the lid 16, with a drive motor shaft 20 directed through the lid coaxially aligned relative to the axis 11*a*. The drive motor shaft 20 is indicated in FIG. 8 for example. An on/off switch 21 is mounted to the lid in adjacency to the motor, with a support plate 22 orthogonally mounted to the lid below the motor, with a mesh grid 24 coplanar with the lid extending below the support plate 22, as indicated in FIG. 3. A plurality of brace bars 23 extend from the support plate 22 on opposed sides of the drive motor 19 to the lid to maintain the support plate in a secure and fixed relationship relative to the lid in use.

A cutter blade 25 is fixedly mounted to the driver motor shaft 20 positioned within the lid for operative communication below the hopper 14. In this manner, garden components are positioned in immediate contact with the blade structure when directed through the hopper 15 in use.

Figure 5:
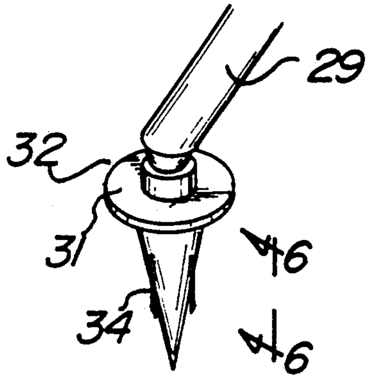
FIG. 5 is an isometric illustration of section 5, as set forth in FIG. 1.
Figure 6:
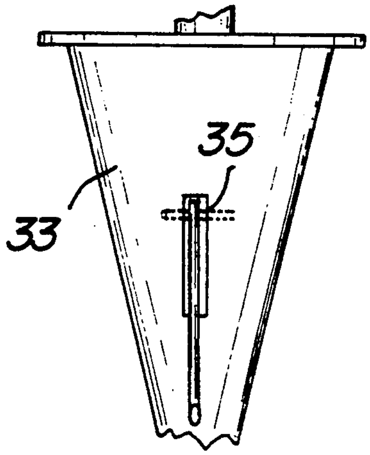
FIG. 6 is an orthographic view, taken along the lines 6—6 of FIG. 5 in the direction indicated by the arrows.
Figure 7:
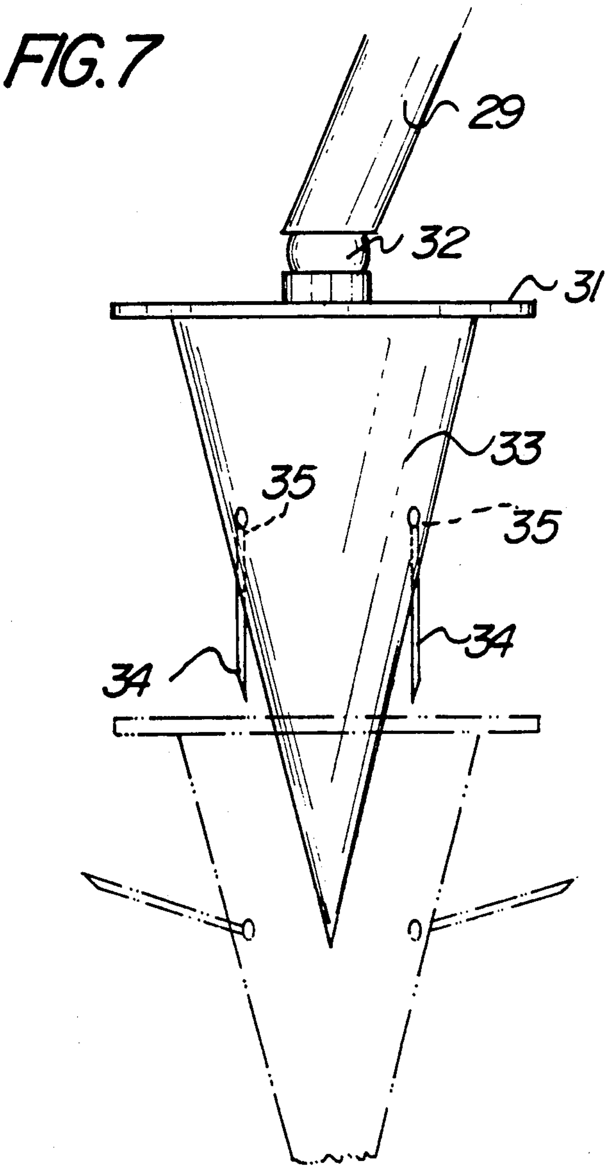
FIG. 7 is an orthographic view of the anchor cone in use.

A plurality of support leg first tubes 26 are mounted to the support plate extending downwardly therefrom, with each of the first tubes 26 having first tube threaded free ends 27. An internally threaded sleeve 28 is arranged to effect selective securement of the first tube threaded free ends 27 to a threaded first end of a second leg tube 29. The second leg tube 29 includes a second leg tube second end plate 31 mounted to a second end of the second leg tube 29, as indicated in FIG. 5. The second end plate 31 includes a swivel connection 32 between the second end plate 31 and the second leg tube free end. The second end plate 31 provides for abutment onto an underlying ground surface *not shown ) when an anchor cone 33 mounted fixedly and below each second end plate 31 is arranged for projection into an underlying ground surface. The anchor cones 33 each include a plurality of anchor rods 34 whose anchor rod first ends are concentrically oriented about the anchor cone, wherein the anchor rod first ends each include a pivot connection 35 pivotally mounting the anchor rods to the anchor cone, whereupon projection of the anchor cone into an underlying ground surface, the anchor rods 34 are pivoted to enhance securement of the anchor cone within the ground surface, as indicated in FIG. 7.

Figure 9:
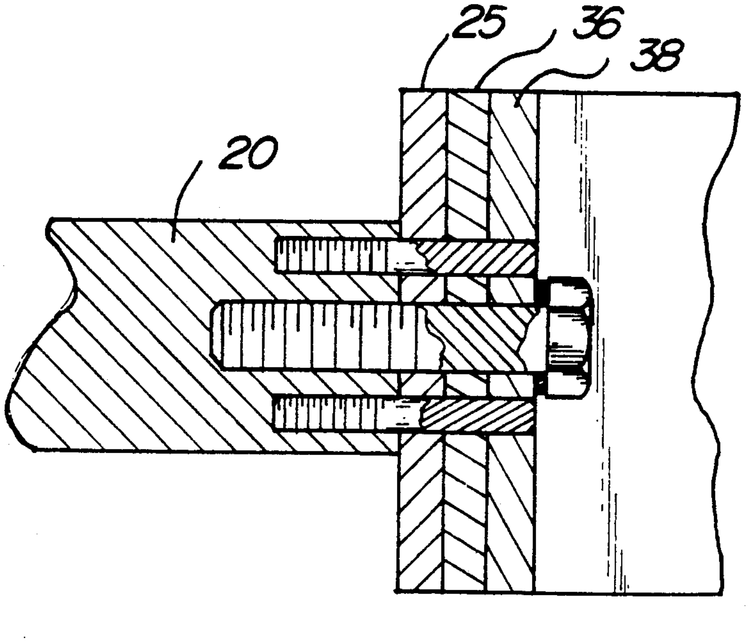
FIG. 9 is an orthographic view, taken along the lines 9—9 of FIG. 8 in the direction indicated by the arrows.

FIGS. 8 and 9 indicate a modified blade structure, wherein the first blade or cutter blade 25 includes a second cutter blade 36 mounted parallel thereto, with the second cutter blade 36 of a second length less than the first length of the cutter blade 25. The second cutter blade 36 includes a second cutter blade U-shaped center section 37 to receive a third cutter blade U-shaped center section 29 of a third cutter blade 38 therewithin. The third cutter blade is of a third length less than the second length. In this manner, thorough shredding of vegetal components directed into the housing structure of the organization is effected and the blade organization, as indicated in FIG. 9, projects the vegetal components towards the housing end wall 12 and reflects such to effect complete shredding of such forward disposal and direction through the mesh grid 24.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A garden shredder apparatus, comprising, a cylindrical housing symmetrically oriented about an axis, and the housing having a planar end wall orthogonally oriented relative to the axis, and a cylindrical side wall, with the cylindrical side wall including a side wall opening, and a hopper extending from the side wall in surrounding relationship relative to the opening, and a housing lid mounted to the side wall, and the side wall having a plurality of side wall fastener rods fixedly mounted to the side wall parallel to the axis, the side wall fastener rods arranged for reception through the lid, with each fastener rod including a securement member mounted to said rods for securing the lid between each securement member and the side wall, and a drive motor fixedly mounted to the lid, with the drive motor having a drive motor shaft directed through the lid coaxially aligned with the axis, and a cutter blade means mounted to the drive motor shaft within the housing to extend below the opening for shredding within the housing upon rotation of the cutter blade means, and the lid having a support plate fixedly mounted to the lid below the drive motor and parallel to the axis, and a mesh grid coplanar with the lid and directed through the lid below the support plate, and the support plate includes a plurality of support leg first tubes fixedly mounted to the support plate, each of the support plate first tubes includes a first tube threaded free end, and each first tube includes a second leg tube, and each second leg tube includes a second leg tube first end and a second leg tube second end, and each second leg tube first end includes a threaded first end portion and an internally threaded sleeve, with the threaded first end directed into the sleeve, and the sleeve secured to said first tube threaded free end, and the second leg tube second end includes a swivel connection and a second end plate mounted to the swivel connection, and an anchor cone mounted to the second end plate for directing the anchor cone into an underlying ground surface, and the anchor cone includes a plurality of anchor rods, with each of the anchor rods having an anchor rod first end and the anchor rod first end of each anchor rod is concentric relative to said anchor cone, and the anchor rod first end is pivotally mounted relative to said anchor cone, and the cutter blade means includes a first cutter blade, a second cutter blade parallel to the first cutter blade and a third cutter blade parallel to the second cutter blade, wherein the first cutter blade is of a first length, the second cutter blade is of a second length, and the third cutter blade of a third length, wherein the second length is less than the first length, and the third length is less than the second length, and wherein the second cutter blade is spaced from the first cutter blade and the third cutter blade and the second cutter blade is oriented medially of the first cutter blade and the third cutter blade.

* * * * *